United States Patent [19]
Bell et al.

[11] 3,878,690
[45] Apr. 22, 1975

[54] LIQUID TRANSFER SYSTEM
[75] Inventors: Martin Bell, Helensburg; Glenn McPherson, Cutherbertson, Clarkston, both of England
[73] Assignee: Barr and Stroud Limited, Glasgow, Scotland
[22] Filed: Mar. 21, 1973
[21] Appl. No.: 343,486

[30] Foreign Application Priority Data
May 30, 1972 United Kingdom............... 25155/72

[52] U.S. Cl..................................... 62/55; 137/210
[51] Int. Cl. ............................................. F17c 7/02
[58] Field of Search......................... 62/55; 137/210

[56] References Cited
UNITED STATES PATENTS
3,537,271  11/1970  Montag........................... 137/210 X
3,750,414  8/1973  Heftman ................................. 62/55

Primary Examiner—Alan Cohan
Assistant Examiner—Gerald A. Michalsky
Attorney, Agent, or Firm—Mason, Fenwick & Lawrence

[57] ABSTRACT

A liquid transfer cooling system utilising the Leidenfrost Effect incorporates a level sensor in the chamber to which liquid is transferred from a storage vessel. The storage vessel has a liquid transfer conduit which is connected externally of the storage vessel to a valved vent tube for the vessel. When the valve means is closed by the level sensor, the liquid in the storage vessel is transferred from the storage vessel to the chamber and when the valve is opened, the conduit is purged of liquid globules by venting vaporized liquid from the storage vessel through the transfer conduit.

4 Claims, 1 Drawing Figure

PATENTED APR 22 1975　　　　　　　　　3,878,690
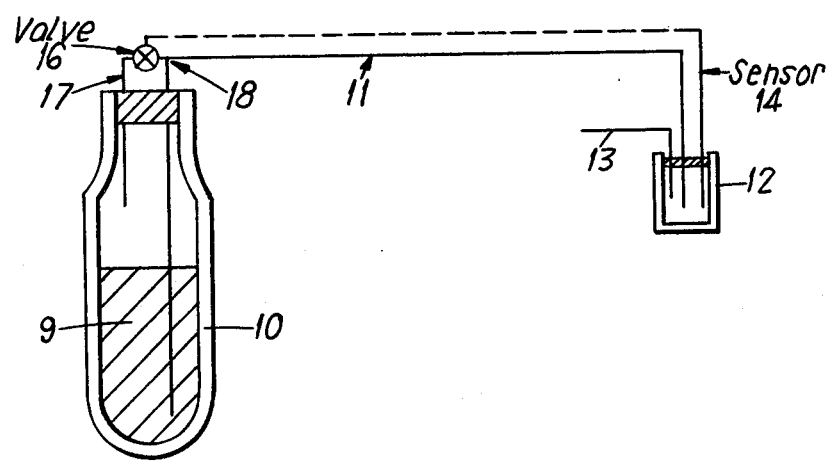

LIQUID TRANSFER SYSTEM

This invention relates to liquid transfer systems utilising the "Leidenfrost" effect.

In many engineering systems there is a need for maintaining one or more components at a predetermined temperature and one way in which this can be achieved where the predetermined temperature is considerably below ambient is to associate the component concerned with a container for holding a suitable liquid coolant and to supply coolant to that container by utilising the well-known Leidenfrost effect.

Various Leidenfrost liquid transfer systems have been proposed in the past and each includes a relatively small closed container in the form of a dewar connected by means of a conduit to a larger closed dewar in which a substantial supply of suitable liquid coolant is stored. The component whose temperature is to be controlled is associated with the smaller dewar and liquid is transferred from the larger dewar to the smaller dewar due to the vapour pressure which builds up within the closed larger dewar due to evaporation of the liquid coolant therein.

This sets up a pressure differential between the two dewars and liquid is transferred as a result, the process ceasing when the differential pressure becomes zero. The liquid transfer takes place under "two phase" flow conditions wherein globules of liquid coolant are surrounded by a layer of vapourised coolant which acts as an insulator and permits the transfer to take place through a conduit which may be thermally conductive.

In order to control the transfer of coolant in such systems a liquid level sensor is incorporated in the smaller dewar, this sensor controlling the condition of a valve in a conduit through which vapour escapes from one or other of the dewars directly to atmosphere, or alternatively the sensor controls the operation of a heating element immersed in the liquid contained in the larger dewar.

These known liquid transfer systems suffer from one or more of the disadvantages that when the system is out of use the smaller of the dewars becomes at least partially moisture filled so that the system requires to be dried before commencing a fresh duty cycle; the transfer conduit tends to trap liquid globules during inoperative periods of each duty cycle thereby causing a lowering of operating efficiency since these globules tend to evaporate; and not all of the liquid coolant contained in the larger dewar is available for transfer to the smaller dewar.

It is an object of the present invention to obviate or mitigate the above disadvantages.

According to the present invention there is provided a liquid transfer system comprising first and second closed dewars interconnected by a conduit for transfer of liquid therealong by means of the Leidenfrost effect, the second dewar being vented and having a sensing means for signalling the need for liquid to be transferred to the second dewar, the first dewar having a valved vent tube interconnecting with said conduit, the valve in said vent tube being under the control of the sensing means.

Preferably the sensing means is operable in accordance with the level of liquid in the second dewar.

An embodiment of the present invention will now be described by way of example with reference to the accompanying drawings, the sole FIGURE of which is in the form of a schematic representation.

In the drawing liquid 9 is stored in a first closed container in the form of a dewar 10 which is connected by means of a flexible conduit 11 to a second closed container 12 which is also in the form of a dewar. The second dewar 12 is vented to atmosphere at 13 and contains a level sensing means 14 which may be conventional in form. The means 14 emits a signal which is representative of the level of liquid in the dewar 12 and in accordance with the present invention is utilised to control a valve 16 in a vent pipe 17 which emerges from the first dewar 10 and terminates in an interconnection 18 with the conduit 11.

We have found it desirable to locate the interconnection 18 adjacent the exit of the conduit 11 from the dewar 10 since this enables the greatest pressure drop to take place between the interconnection 18 and the second dewar 12 and this in turn maximises efficiency of operation. Also, we have found it desirable to so construct the interconnection 18 that it forms a Y-shape whereby turbulence effects may be minimised so that liquid flow under the Leidenfrost effect may remain undisturbed.

During operation of the present invention when the liquid in the dewar 12 is at the desired level the valve 16 is in its open position, and in this state the continual vapourisation of the liquid in the dewar 10 due to transfer of heat from ambient surroundings causes the vapour or gas to flow along the conduit 11 to the dewar 12 thereby preventing any liquid globules from remaining trapped in the conduit 11. Furthermore, when the liquid level in the dewar 12 drops below the desired level the sensing means 14 causes the valve 16 to close so that liquid transfer to the dewar 12 takes place under the Leidenfrost effect. Gas or vapour released from the liquid contained in the dewar 12 is vented to atmosphere.

By virtue of the system according to the present invention it is possible to operate without any substantial waste of liquid since the projection of the conduit 11 into the dewar 10 is limited only by the mechanical consideration that fouling of the dewar 10 must be prevented. Furthermore, during inoperative periods during a duty cycle the vapour from the liquid in the dewar 10 is vented to atmosphere along the conduit 11 which therefore does not trap liquid globules. Also, during periods when the apparatus is out of use the valve 16 may be arranged to be in the open position so that there is substantially continuous venting of vapour to atmosphere through the conduit 11 and the second dewar 12 and this prevents ingress of moisture and removes or 'purges' any which is already there. This out-of-use venting is limited only by the capacity of the dewar 10.

The level sensing means 14 may be of any conventional type which provides an indication of the level of liquid within the dewar 12 and it may, for example, incorporate a semi-conductor element whereby an electrical signal representative of liquid level is emitted. The emitted signal may also be mechanical or hydraulic or pneumatic in nature depending upon the type of sensing means utilised.

The means 14 need not however be dependent upon the liquid level within the dewar 12 but may for example sense the rate of escape of vapour from the dewar 12 to atmosphere. The means 14 may also be pressure dependent, but in this case it would be probable, but not essential, that a valve would also be provided in the vent from the dewar 12.

Likewise the nature of the valve 16 is immaterial to the present invention although in one embodiment the valve 16 is solenoid operated and is so arranged as to compress the walls of a felxible portion of the vent pipe 17. It may however be convenient to use a rotor cam mechanism or any other form of valve suitable to switch between open and convenient conditions.

The form of the dewar 12 may be determined by the engineering system within which the liquid transfer system is to operate and it may be specially adapted to operate in conjunction with the component which is to be temperature controlled. Conveniently either or both dewars may incorporate pressure release safety valves.

The coolant liquid may be liquid nitrogen but other liquid coolants could be utilised.

What is claimed is:

1. A vaporizable liquid transfer system comprising a first closed dewar, a second closed dewar, a conduit interconnecting the first and second dewar for transfer of the vaporizable liquid therealong by means of the "Leidenfrost" effect, a vent to atmosphere on the second dewar, sensing means on the second dewar for signalling the need for liquid to be transferred to the second dewar from the first dewar in order to maintain a predetermined level of liquid in the second dewar, a vent tube from the first dewar interconnecting with said conduit and a valve means in said vent tube under the control of the sensing means for causing the transfer of liquid from the first dewar to the second dewar when the valve means is closed and for causing purging of the conduit of liquid when the valve means is opened by venting vaporized liquid in the first dewar through the conduit whereby any globules of liquid remaining in the conduit after the valve means is opened are transferred into the second dewar by said vaporized liquid.

2. A system as claimed in claim 1, wherein the sensing means is sensitive to the level of liquid in the second dewar.

3. A system as claimed in claim 1, wherein the connection between the conduit and the vent tube is adjacent the exit of the conduit from the first dewar.

4. A system as claimed in claim 3, wherein said connection is Y-shaped so as not to interfere with liquid transfer under Leidenfrost conditions.

* * * * *